United States Patent [19]

Sakanaka et al.

[11] Patent Number: 5,264,955
[45] Date of Patent: Nov. 23, 1993

[54] OPTICAL SPACE COMMUNICATION APPARATUS

[75] Inventors: Tetsuo Sakanaka, Sagamihara; Haruo Imano, Yokohama; Yasusaburo Degura, Kawasaki, all of Japan

[73] Assignee: Canon Kabushiki Kaisha, Tokyo, Japan

[21] Appl. No.: 887,586

[22] Filed: May 20, 1992

Related U.S. Application Data

[63] Continuation of Ser. No. 460,254, Jan. 2, 1990, abandoned.

[30] Foreign Application Priority Data

Jan. 9, 1989 [JP] Japan .................... 1-2259
Mar. 10, 1989 [JP] Japan .................... 1-58619

[51] Int. Cl.$^5$ ............................. H04B 10/00
[52] U.S. Cl. .................... 359/152; 359/164; 359/172
[58] Field of Search ............ 359/164, 159, 143, 172, 359/152, 180, 189

[56] References Cited

U.S. PATENT DOCUMENTS

| | | | |
|---|---|---|---|
| 3,492,484 | 1/1970 | Ito | 250/199 |
| 4,063,083 | 12/1977 | Cathey | 455/607 |
| 4,499,608 | 2/1985 | Broockman | 455/617 |
| 4,512,036 | 4/1985 | Laor | 455/607 |
| 4,527,285 | 7/1985 | Kekas | 455/602 |
| 4,566,134 | 1/1986 | Harbour | 455/607 |
| 4,612,670 | 9/1986 | Henderson | 455/602 |
| 4,793,000 | 12/1988 | Imano et al. | 455/619 |
| 4,850,044 | 7/1989 | Block et al. | 359/159 |
| 4,864,651 | 9/1989 | Ogiwara et al. | 455/617 |

FOREIGN PATENT DOCUMENTS

| | | | |
|---|---|---|---|
| 0115768 | 8/1984 | European Pat. Off. | |
| 0095741 | 6/1984 | Japan | 359/159 |

OTHER PUBLICATIONS

Optical Multiple Access System for Intersatellite Communications, M. A. Grant et al., SPIE, vol. 966 at 42 (Sep. 1988).
Patent Abstracts of Japan, vol. 8, No. 91 (E-241) (1528), Apr. 26, 1984.

*Primary Examiner*—Richard E. Chilcot, Jr.
*Assistant Examiner*—Kinfe-Michael Negash
*Attorney, Agent, or Firm*—Fitzpatrick, Cella, Harper & Scinto

[57] ABSTRACT

An optical space communication apparatus such as an optical space communication transceiver comprises a plurality of modules which can be coupled and separated from each other. In the modules, the positions of optical elements are adjusted beforehand with respect to coupling reference portions of the modules which are to constitute a common reference at the time of coupling of the modules. As a result, the modules can be automatically positioned relative to one another at the time of coupling therebetween. Alternatively, one of the plurality of modules may have a stand reference portion having a predetermined positional relationship with its optical element and its coupling reference portion. The stand reference portion is coupled to the reference portion of the stand whose angle can be adjusted to thereby constitute the common reference.

11 Claims, 6 Drawing Sheets

OPTICAL SPACE COMMUNICATION APPARATUS

This is a continuation of application Ser. No. 07/460,254, filed on Jan. 2, 1990, now abandoned, currently entitled OPTICAL SPACE COMMUNICATION APPARATUS.

BACKGROUND AND SUMMARY OF THE INVENTION

The present invention relates to an optical space communication apparatus such as an optical space communication transceiver for sending an optical signal in a free space to perform optical communication.

In a conventional optical space communication apparatus shown in FIG. 1, a transmitter 37 comprises a means (modulating circuit) 31 for modulating an input electrical signal into a signal having a format suitable for optical space communication, a means (optical element) 32 for amplifying the modulated signal, driving a light-emitting element such as a light-emitting diode or a semiconductor laser on the basis of the amplified signal, and converting the electrical signal into an optical signal, and a means (optical system) 33 for causing an optical member such as a lens to convert a beam emitted from the light-emitting element into a fan beam having a necessary spread angle. A receiver 38 comprises a means (optical system) 34 for causing an optical member such as lens to focus a beam from the transmitter 37 onto a photodetecting element such as a photodiode, a means (optical element) 35 for causing the photodetecting element to convert the optical signal into an electrical signal and amplifying the electrical signal to a signal having a predetermined level, and a means (demodulating circuit) 36 for demodulating into a signal of the original format the electrical signal converted from the optical signal.

In this apparatus, strict positional alignment is required between the optical systems 33 and 34 such as lenses and the optical elements 32 and 35 such as a light-emitting element and a photodetecting element. The modulating and demodulating circuits 31 and 36 must be mounted near the optical elements in consideration of the mounting forms since these circuits 31 and 36 process high-frequency signals.

Since this apparatus is used outdoors for a long period of time, it requires a rigid, waterproof housing. The functional components such as the transmitter and the receiver must be appropriately arranged inside the housing.

In addition, direction and angle adjusting means are required to appropriately direct the transmitter consisting of the functional components protected in the housing toward the receiver consisting of its functional components. These adjusting means are generally mounted in the lower portion of the housing. Greater precision is required in angular adjustment when a communication distance is increased.

In the conventional structure, however, the housing is disassembled at the time of internal failures and repairing. When failed components are the optical elements or after repairing, those portions 32 and 35 near the optical elements, the optical elements or their neighboring portions 32 and 35 must be aligned with the optical systems 33 and 34 such as lenses. It is difficult to perform this adjustment on the spot. The associated components must be removed and adjusted in an appropriate location, such as a factory. When the repaired components are remounted in the housing, the angle of the apparatus as a whole must also be adjusted.

Even if a failed component is different from those described above, it is difficult to check the failed component after the waterproof, rigid, outdoor housing is disassembled. During disassembly, the position of the optical element with respect to the optical system may be shifted or the angle of the apparatus as a whole may deviate from the correct angle. Therefore, in such a case, readjustment is required. Similar problems are posed at the time of inspection or the like except for the absence of internal failure.

As described above, although the apparatus is used outdoors for a long period of time, it must be capable of achieving highly accurate positional and angular adjustment. Thus, it is difficult to appropriately install, repair, and maintain the apparatus. Therefore, conventional optical space communication apparatus are not easily handled by a user.

Furthermore, an optical space communication apparatus may be used over a range from a short distance of 10 m to a long distance of several km. As the communication distance is increased, greater accuracy in angular precision, optical characteristics, and electrical characteristics (e.g., reception sensitivity) are required. Transmission signals have different forms, i.e., analog and digital signal forms, and the communication speed ranges from a low speed which can be easily controlled to a high speed. When transmission signal speed is increased, higher performance is required in electrical circuits, light-emitting and light-receiving elements, and modulating and demodulating circuits of the transmitter and the receiver. In order to satisfy these various needs, products may be developed in a range from a low-end product to a high end product depending on the purposes of applications. Alternatively, or the specifications of the apparatus may be designed to comply with the most strict requirements. However, such an implementation results in high cost, without any economical advantage.

It is, therefore, an object of the present invention to provide an optical space communication apparatus which can solve all problems posed by installation, repairing and maintenance of the apparatus, and meet various requirements.

In order to achieve the above object of the present invention, an optical space communication apparatus (transmitter and receiver) according to the present invention comprises a plurality of modules which can be separated from each other. Positions of optical elements such as an optical system, or a single optical element, as well as a CCD of the modules are adjusted beforehand to have a predetermined relationship with coupling reference portions of the modules which constitute a common reference at the time of coupling, thereby allowing automatic positioning at the time of coupling of the modules. Alternatively, one of the plurality of modules may have a stand reference portion having a predetermined positional relationship with its optical element and its coupling reference portion. The stand reference portion is coupled to the reference portion of the stand whose angle can be adjusted, thereby constituting the common reference.

DESCRIPTION OF THE PREFERRED EMBODIMENTS

Figure 2:
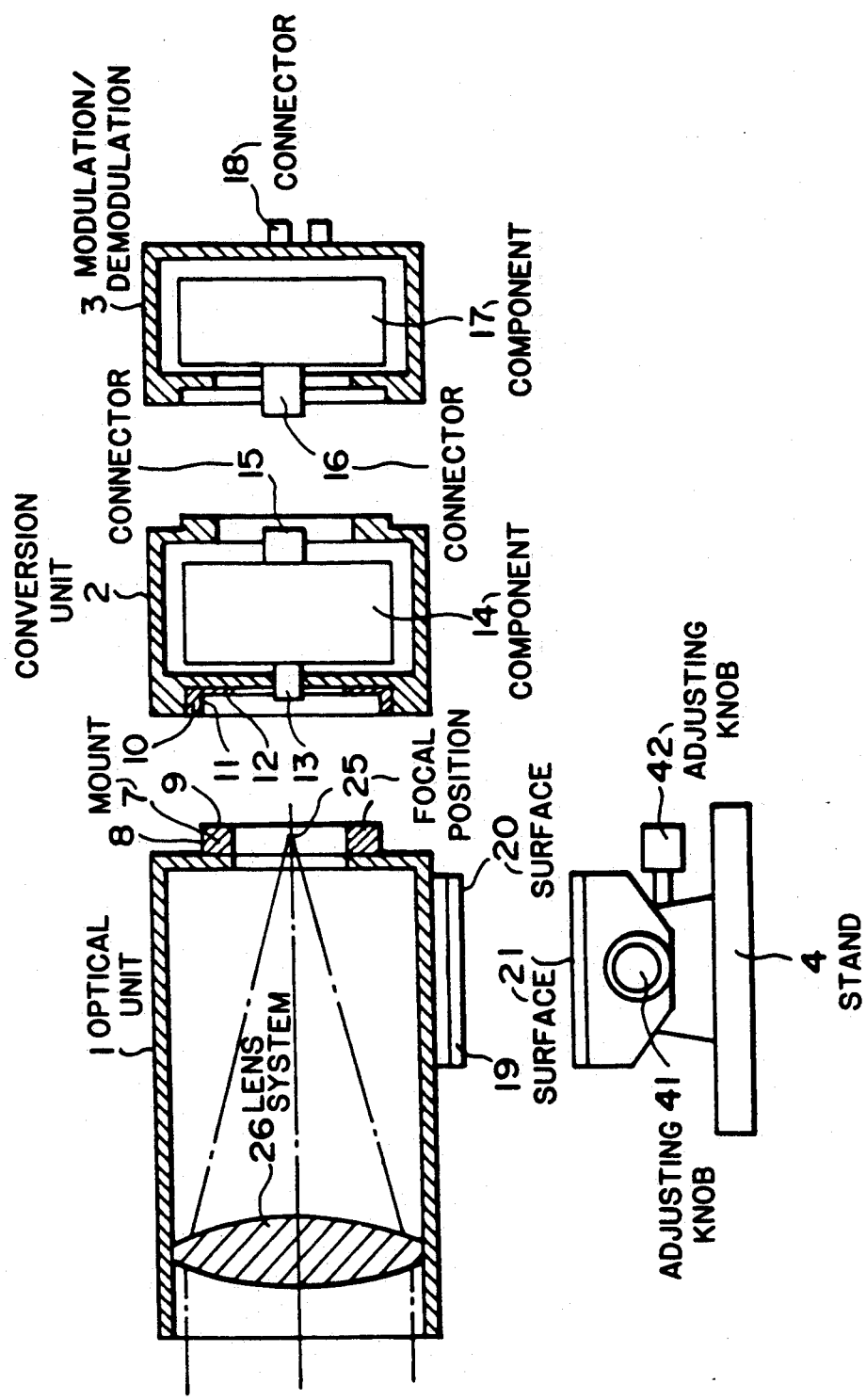
FIG. 2 is an exploded view showing modules constituting an optical space communication apparatus according to an embodiment of the present invention.

FIG. 2 is an exploded view of modules (functional components) of an optical space communication apparatus according to an embodiment of the present invention.

Referring to FIG. 2, the optical space communication apparatus comprises an optical module (optical unit) 1 for performing geometric optical operations, a conversion module (conversion unit) 2 for performing photoelectrical conversion between an optical signal and an electrical signal, a modulation/demodulation module (modulation/demodulation unit) 3 for performing modulation/demodulation of the signal, and a stand 4 having an angle adjusting mechanism.

Since the optical space communication apparatus is often installed outdoors, a waterproof implementation is provided to prevent degradation of the apparatus against changes in weather. In addition, since a communication line cannot be assured unless the transmitter is accurately aligned with the receiver, an angle adjusting mechanism for adjustment in four directions, i.e., upper, lower, right, and left directions, is mounted in the housing. The angle adjusting mechanism is mounted in the lower portion of the apparatus.

A lens system 26 is mounted in the optical module 1, and a point 25 corresponds to its focal position. A base 19 to be coupled to a stand 4 and a mount 7 serving as a coupling reference portion coupled to the conversion module 2 are mounted on the optical module 1.

Figure 1:
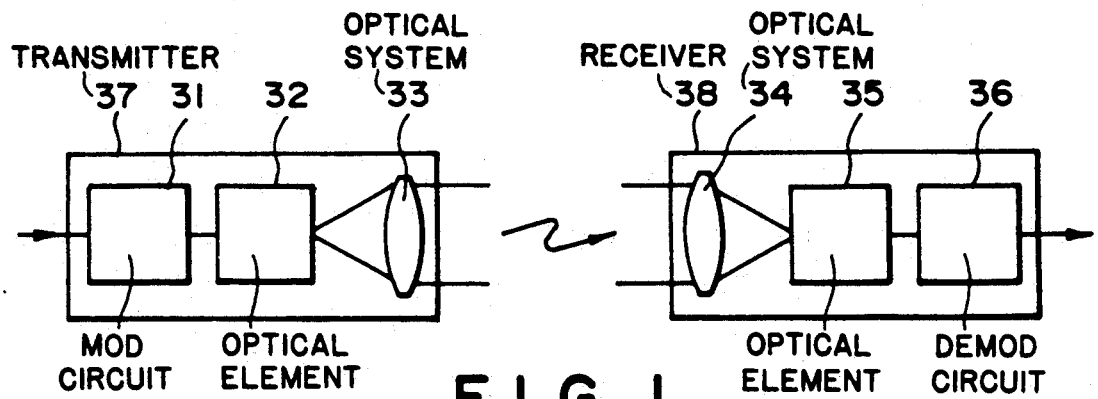
FIG. 1 is a view showing an arrangement of a conventional optical space communication apparatus.
Figure 3:
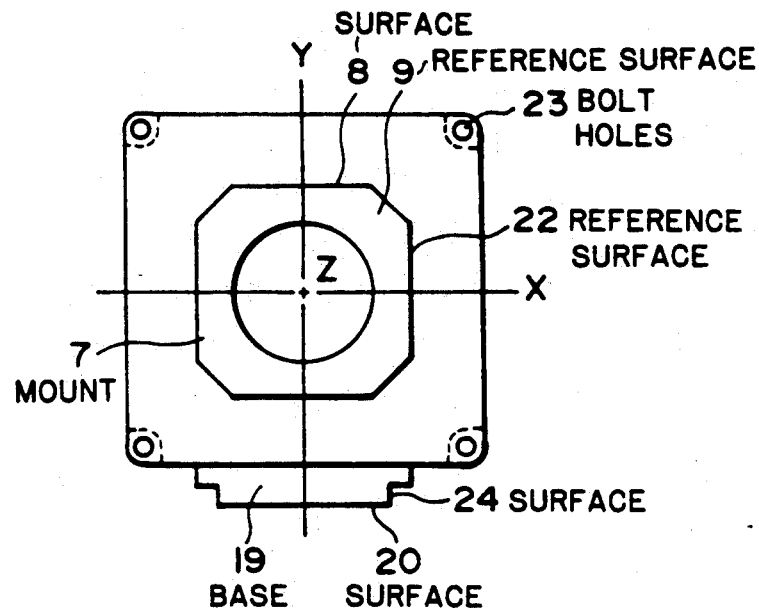
FIG. 3 is a view showing an optical module viewed from rear side thereof.

Referring to FIG. 3 in which the optical module 1 is viewed from the conversion module 2, surface 20 and surfaces 24 of the base 19 serving as stand reference portions are precisely machined and serve as reference surfaces for determining an angle of the apparatus so that the optical axis is parallel with the surfaces thereof. Surface 20 is parallel to the X-axis, and surfaces 24 are parallel to the Y-axis. The intersection between the X- and Y-axes corresponds to an optical axis of the optical system 26. A reference surface 21 serving as a reference portion of the stand 4 coupled to the base 19 is also precisely machined as described above with respect to surface 20 and surfaces 24. The surfaces 20 and 24 of the base 19 serving as a stand reference portion are brought into contact with surface 21 which serves as the reference portion of the stand 4, so that the optical module 1 is mounted on the stand 4. As a result, the direction of the optical axis of the optical system 26 with respect to the surface 21 of the stand 4 is determined. A rotary knob 41 for adjusting a horizontal angle and a rotary knob 42 for adjusting a vertical angle are rotated to adjust the angle of the stand 4. When the angular position with respect to the two axes of the surface 21 is fixed (i.e., when the position of the surface 21 in the space is determined), the direction of the optical axis of the optical system 26 in space is determined.

As shown in FIG. 3, the mount 7 determines reference coordinates of the focal position 25 of the optical system 26 in the lateral (X) direction, the vertical (Y) direction, and the optical axis (Z). More specifically, positioning is performed such that the optical axis of the optical system 26 is aligned with the center of the mount 7. A surface 8 serves as a reference surface in the Y direction, a surface 22 serves as a reference surface in the X direction, and a surface 9 serves as a reference surface in the Z direction. Since the adjustment has been performed as described above, when the optical module 1 is mounted on the stand 4, the direction of the optical axis of the optical system 26 is determined. At the same time, the focal position 25 with respect to the mount 7 is also determined. That is, the stand reference portion has a predetermined positional relationship (i.e. preadjusted and fixed) with the optical element of the optical module 1 and the reference portion for coupling.

The conversion modules 2 having different functions can be selectively coupled to the optical module 1 according to the application. For example, when the apparatus is used as a transmitter, the conversion module 2 shown in FIG. 2 is a module for amplifying an electrical signal and driving a light-emitting element to convert the electrical signal into an optical signal. In this case, a component 13 comprises a light-emitting element such as a light-emitting diode or a semiconductor laser. A component 14 comprises a light-emitting driver circuit including an electrical signal amplifier, a stabilizing circuit for the light-emitting element 13, and a cooling control circuit for the light-emitting element 13. However, when the apparatus is used as a receiver, the component 13 comprises a photodetecting element such as a PIN photodiode or an avalanche photodiode, and the component 14 comprises a preamplifier for amplifying a reception signal. This preamplifier includes a bias control circuit for controlling a bias voltage applied to the photodetecting element 13 with respect to a change in temperature as needed, and a detecting circuit for monitoring a reception signal power.

The conversion module 2 is electrically connected to the modulation/demodulation module 3 through a connector 15.

A mount 10 of the conversion module 2 coupled to the mount 7 of the optical module 1 has reference surfaces 11 and 12 corresponding to the reference surfaces 8, 9 and 22 of the mount 7. The position of the light-emitting or photodetecting element 13 is appropriately preadjusted with respect to the reference surfaces 11 and 12. When the conversion module 2 is mounted on the optical module 1, the reference surfaces 8, 9, and 22 of the mount 7 are brought into contact with the reference surfaces 11 and 12 of the mount 10. Therefore, the focal position 25 of the optical system 26 of the optical module 1 automatically coincides with the position of the light-emitting or photodetecting element 13.

The installation and fixation between the modules 1 and 2 are easily conducted by the use of bolt holes 23 for installation positioned at the corners, as shown in FIG. 3. The automatic positioning described above is assured since the mount portions are constructed so that the reference surfaces 8, 9 and 22 of the mount 7 and the reference surfaces 11 and 12 of the mount 10 are mutually urged by the mechanism such as a plate spring when installed.

The optical space communication apparatus of the present invention is constituted by a plurality of modules which can be coupled to or separated from each other. The positions of the optical elements of the respective modules are adjusted beforehand to have a predetermined relationship with the coupling reference portions of the modules constituting the common reference at the time of coupling such that these modules can be automatically positioned at the time of coupling of the modules.

The modules constituting the optical space communication apparatus of the present invention are modules having optical elements and coupling reference portions having predetermined positional relationships with these optical elements. The coupling reference portion of one module is coupled to that of another module to constitute a common reference.

Since the apparatus employs the above coupling system, the optical element 13 can be accurately located at a predetermined position with respect to the optical system 26 even when the module 2 is replaced with another. That is, module replacement can be performed without any adjustment, and repairing and maintenance can be greatly facilitated.

The module 3 serves as the modulation/demodulation module. When the apparatus is used as a transmitter, a component 17 comprises a modulator. On the other hand, when the apparatus is used as a receiver, the component 17 comprises a demodulator. The modulation/demodulation module includes an electrical circuit having a modulation/demodulation function. The modulation/demodulation module 3 is connected to the conversion module 2 through a connector 16 which is electrically connected to the connector 15 of the conversion module 2. The modulation/demodulation module 3 is connected to an external signal or a power source through a connector 18. Greater mechanical or positional precision is not required in coupling between the modules 2 and 3, but the electrical connection therebetween must be assured.

The modules 1, 2, and 3 have waterproof housings so that they can be used outdoors. Rubber packings may be used at the connecting portions between the modules so as to prevent external water from entering into the connecting portions.

The optical module 1 may incorporate a heater for preventing the lens surface from dewing due to cold weather and a heater control circuit as needed. In order to prevent influences of direct sunbeams and strong winds, a cover may be disposed to cover the entire apparatus. In this case, the cover may be made of FRP (fiber-reinforced plastic) because FRP is lightweight and excellent in mechanical strength and weather resistance.

Figure 4:
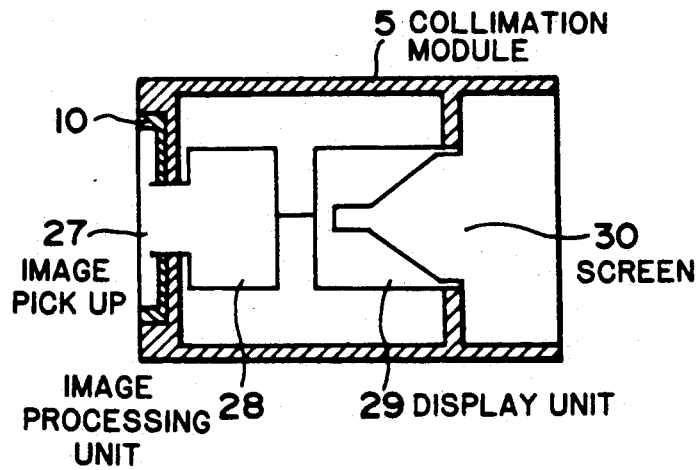
FIG. 4 is a view showing an interchangeable module for collimation.

FIG. 4 shows a collimation module 5 mounted on the optical system module 1 in place of the conversion module 2 to adjust an angle at the time initial installation of the apparatus. An image pickup element 27 such as a CCD is mounted at a position corresponding to the optical element 13 of the conversion module 2. A mount 10 of the collimation module 5 is the same as the mount 10 of the conversion module 2.

Referring to FIG. 4, the collimation module 5 comprises a camera image processing unit 28 and a compact image display unit 29 such as a CRT. The display unit 29 is adjusted with respect to the reference surface of the mount 10 such that an image at the focal position 25 of the optical system 26 is displayed at the center of a cross marked on a screen 30.

When the collimation module 5 is mounted on the optical module 1 and is directed to a mating communication apparatus, a scene near the mating communication apparatus is displayed on the display unit 29. The adjustment of an angle or azimuth of the apparatus can be performed by positioning the mating apparatus image at the center of the cross on the screen 30. This angular adjustment is performed by using angle adjusting knobs 41 and 42 of the stand 4, and the surface 21 of the stand 4 is fixed when the mating apparatus image is located at the center of the cross.

In this case, if the mating apparatus has a light source, this apparatus is displayed as a bright point. In general, since infrared rays are used in optical space communication of this type, the image pickup element 27 comprises an infrared sensor. When an optical filter for shielding visible light is located in front of the infrared sensor, a clearer bright point is obtained.

In this manner, the angular adjustment of the apparatus toward the mating apparatus can be facilitated. Upon completion of the angular adjustment, when the conversion module is replaced with a desired conversion module, the optical element 13 is automatically located at the accurate position, thereby facilitating adjustment at the time of installation of the apparatus.

The image pickup element 27 such as a CCD may not be used in the collimation module 5. In this case, even if a simple optical filter having a screen at the focal position of the optical system 26 is used, the same result as described above can be obtained except that the infrared ray cannot be directly observed and the screen will be slightly dark. The display unit 29 such as a CRT may not be incorporated in the module 5, but can be an external monitor connected to the module 5 through a cable.

In the apparatus of the present invention, repairing and functional modifications can be performed simply by module replacement, and angular and positional adjustment operations at the time of replacement need not be performed. In addition, adjustment at the time of initial installation is simplified. Therefore, even an unskilled user can easily perform installation, maintenance, and functional modifications.

The characteristic feature of the present invention which allows easy functional modifications and a wide range of changes in technical specifications will be described in detail below.

In the above embodiment, the module 1 is not changed, whereas the modules 2 and 3 are changed to modules having different functions so as to selectively use the optical space communication apparatus as the transmitter or receiver. In addition, module replacement can satisfy various requirements. For example, the communication distance ranges from a short distance of several tens of meters to a long distance of several km, as previously mentioned. According to the present invention, the modules 1 and 3 are not changed, while the module 2 is replaced with another module having an appropriate function.

That is, in long-distance communication, a module having a high-output semiconductor laser used in the transmitter can be combined with a module having a high-sensitivity avalanche photodiode used in the receiver.

In short-distance communication, a module having a light-emitting diode in the transmitter to simplify a peripheral circuit at a relatively low cost can be combined with a module having a PIN photodiode in the receiver to perform effective communication at low cost. A low-cost module may be used as the optical module 1 in short-distance communication since strict optical requirements are not imposed.

There are various types of signal form such as digital and analog schemes. These different signal forms can be satisfied by changing only the modulation/demodulation module 3 while the modules 1 and 2 are kept unchanged. For example, as for digital signals, a modulation module of a PSK (phase shift keying) or FSK (frequency shift keying) scheme is used in the transmitter, and a demodulation module of the corresponding scheme is used in the receiver.

As for analog signals such as a video signal, modulation and demodulation modules of an FM (frequency modulation) or AM (amplitude modulation) scheme are used, and signal transmission can be freely performed within the range complying with the signal levels and frequency ranges between module 2 and module 3. In addition, the conversion module 2 can be replaced with a low-cost module for transmission of low-speed signals.

As described above, various combinations of modules can satisfy various needs of communication. In addition, complicated adjustment at the time, of assembly and installation of the modules or at the time of replacement of modules is eliminated.

As described above, the optical space communication apparatus (transmitter and receiver) according to the present invention is constituted by a plurality of modules and portions which are required for high precision of mechanical and optical positions of the modules, which are positioned with respect to the common reference portion. Therefore, adjustment is not required at the time of assembly and replacement of the modules. Therefore, assembly, installation, and replacement can be easily performed. Therefore, maintenance, repairing, and functional modifications are facilitated.

In an optical space communication system for performing communication using optical signals through free space as a transmission line, an optical transmission signal is itself influenced by an atmospheric condition in the transmission line.

For example, there are variations in beam position caused by building vibrations having a long cycle, irregular changes in refractive index of air, turbulences by winds as well as variations (scintillation) of the reception beam power caused by air fluctuations having a short cycle.

In this manner, the quality of the communication channel as the transmission line is adversely affected by the atmospheric conditions, and it is difficult to assure a stable communication channel.

For this reason, a beam diameter is increased at the beam reception point, or the diameter of the light-receiving lens is increased. When the beam diameter is increased at the beam reception point, only part of the total power of the beam is incident on the light-receiving lens, thus degrading beam reception efficiency. Even if the diameter of the light-receiving lens is increased, the receiver becomes bulky and heavy. Accordingly, the angle adjusting mechanism which supports the receiver is bulky. Since the apparatus including the angle adjusting mechanism becomes bulky and heavy and results in high cost, the user cannot easily handle this apparatus.

An automatic gain control amplifier having a low NF (noise figure), a high gain, and a high response speed may be used in an electrical system of an O/E (optical-to-electrical) converter on the light-receiving side to correct short-cycle variations in beam reception power by scintillation. There is great room for improvement so as to realize this arrangement.

In order to solve the above problems, an optical space communication apparatus capable of satisfying a variety of applications, requiring simple maintenance and installation, and providing stable performance will be described below.

In order to solve the above problems, in an optical space communication apparatus of the present invention, at least one of a transmitter and a receiver is constituted by a single unit, and a plurality of single units are combined to constitute an optical space communication apparatus. The unit will be referred to as a transmitter unit or receiver unit.

The transmitter and receiver units can be constituted by various combinations. In addition, each unit may be constituted by a plurality of function modules which can be separated from each other.

Coupling means for combining the units may be arranged in the units or may be arranged in support means such as a stand for supporting the unit. The structure of the coupling means may be designed such that the optical axes of the plurality of units are automatically aligned in one direction.

Since various transmitter and receiver units can be arbitrarily combined, multifunctional arrangements can be obtained from the qualitative and quantitative viewpoints, thus assuring stable communication.

For example, bidirectional communication, an increase/decrease in light emitting power, wavelength multiplex communication, space diversity which cancels fading, wavelength diversity, a tracking function of mating transmitter and receiver and the like can be simultaneously obtained individually or in combinations.

"Diversity" as used herein refers to is a scheme for synthesizing a plurality of signals having different characteristics into a single signal. The space diversity is a scheme for synthesizing signals having different spatial positions into a single signal. Wavelength diversity is a scheme for synthesizing signals having different wavelengths into a single signal.

When each unit is constituted by a plurality of function modules, the above functions are easily and appropriately achieved.

When the structure of the coupling means for connecting a plurality of units is implemented, the units can be arbitrarily combined, and at the same time the optical axes of all units can be aligned in one direction without adjustment or with slight adjustment. Angular adjustment of the unit in four directions can be simply performed by arranging an angle adjusting mechanism in the unit or the support means of the unit.

Figure 5:
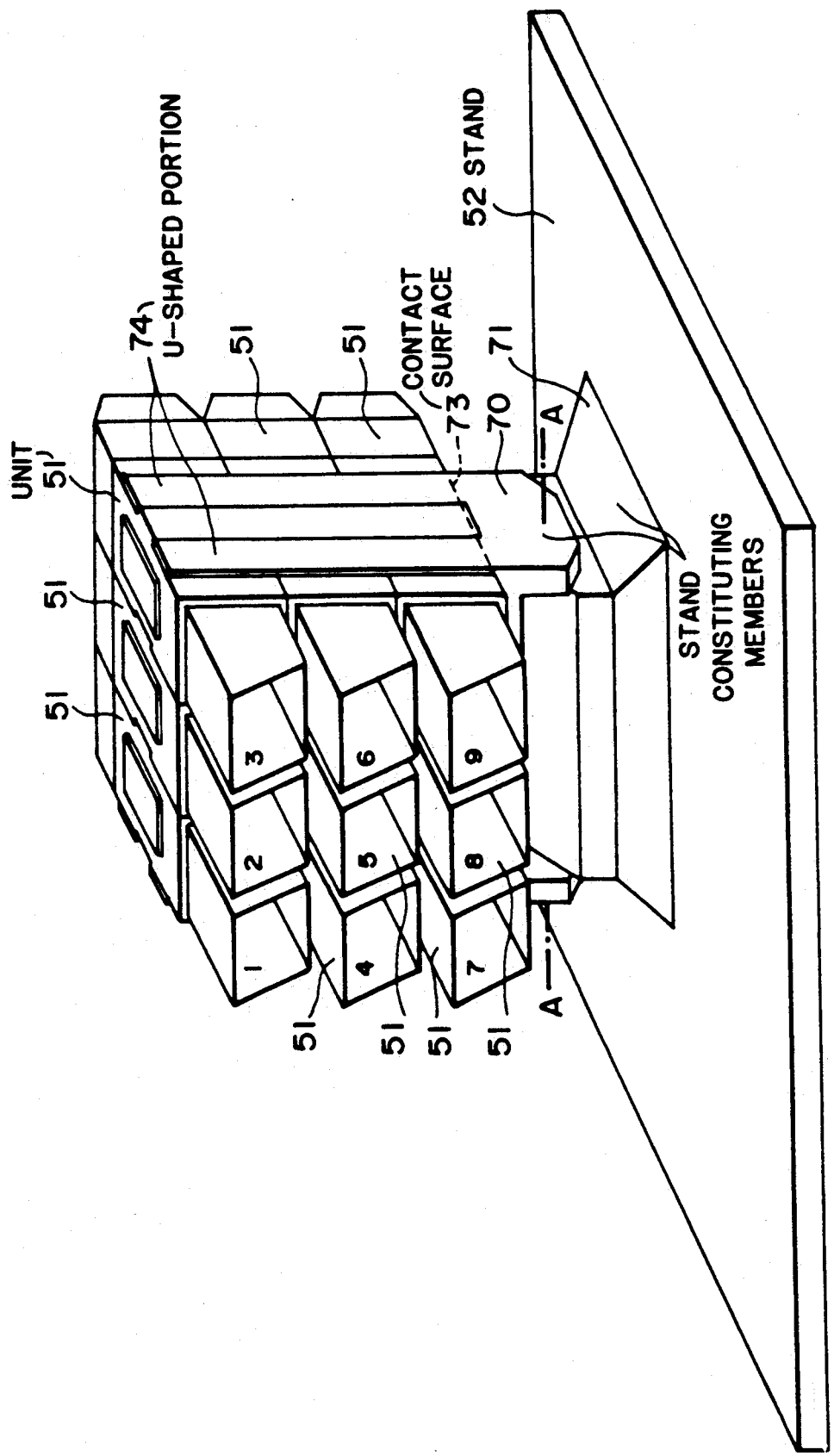
FIGS. 5, 9 and 10 are views showing optical space communication apparatuses made by two-dimensionally combining units.
Figure 6:
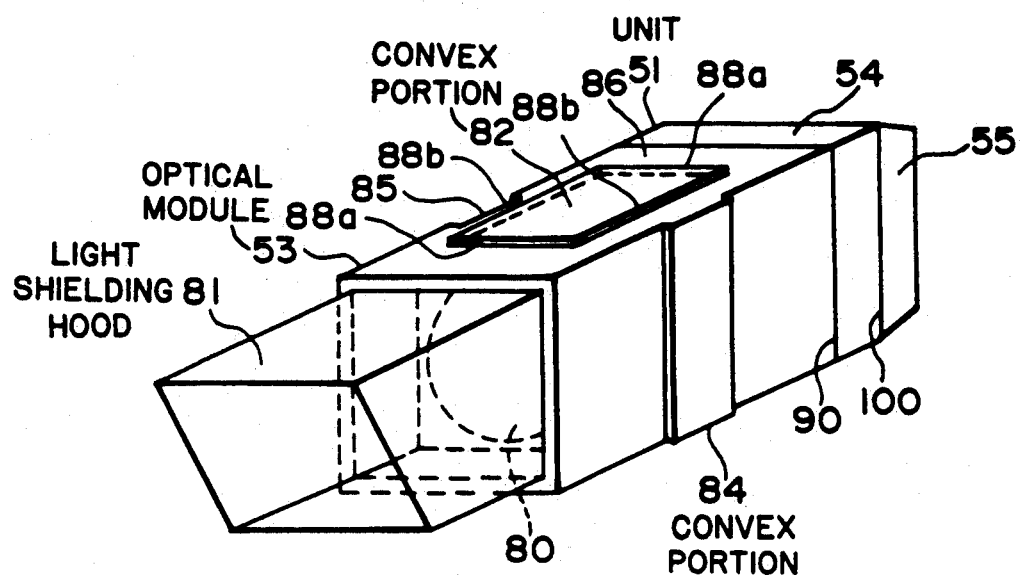
FIG. 6 is a perspective view of the unit shown in FIG. 5.
Figure 7:
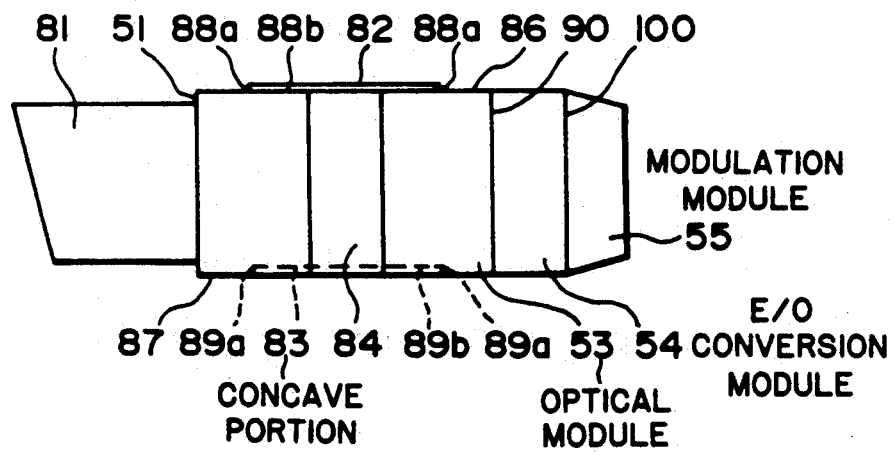
FIG. 7 is a side view of the unit shown in FIG. 5.

FIGS. 5 to 7 show an optical space communication apparatus according to an embodiment of the present invention. FIG. 5 shows the optical space communication apparatus obtained by two-dimensionally combining units 51. FIGS. 6 and 7 show the unit 51 as one unit.

Referring to FIG. 5 the communication apparatus obtained by combining the units 51 has a supporting means which is a stand 52. The stand 52 has a mechanism for adjusting the angle of the apparatus in four directions, i.e., upper, lower, right, and left directions. This angle adjusting mechanism comprises a stand constituting member 70 which is rotated about the A-axis to adjust the angle of the apparatus in the upper and lower directions, and a stand constituting member 71 which is rotated about a vertically extending axis (in FIG. 5) to perform angular adjustment.

Referring to FIGS. 6 and 7, each unit 51 comprises modules (functional parts) 53, 54, and 55. The module 53 comprises an optical module including a lens system 80. The module 54 constitutes an E/O conversion module including an E/O converter in a transmitter or an O/E conversion module including an O/E converter in the receiver. The module 55 constitutes a modulation module including a modulator for modulating an input signal in the transmitter or a demodulation module for demodulating the electrical signal converted by the O/E converter into an original signal in the receiver.

The optical module 53 includes a light shielding hood 81 for shielding disturbing beams such as a sunbeam, a convex portion 82 formed on the upper surface to serve as a coupling means, a concave portion 83 formed on the lower surface to serve as a coupling means, a convex portion 84 formed at the right side portion (FIG. 6) to serve as a coupling means, and a concave portion 85 formed at the left side portion (FIG. 6) to serve as a coupling means. The inner surface of the light-shielding hood 81 is painted in black so as to prevent irregular reflection of the incident disturbing beams inside the hood. The portions 82, 83, 84, and 85 constituting the coupling means are respectively engaged with the lower surface concave portions, the upper surface convex portions, the left side surface concave portions, and the right side surface convex portions of upper, lower, left, and right units adjacent to the unit 51 so as to make these adjacent units separable. A means for coupling the units is arranged outside the units.

In order to assure that any directional errors of the optical axes of the respective units 51 fall within an allowable range when the units 51 are assembled in the horizontal and vertical directions, upper and lower surfaces 86 and 87 are precisely machined to be flat. Side surfaces 88a and 88b of the convex portion 82 and side surfaces 89a and 89b of the concave portion 83 of each unit 51 are also machined to have appropriate precision.

A surface 73 (FIG. 5) of the stand 52 which is brought into contact with the unit 51 is also machined to be flat in the same manner as surfaces 86 and 87. A convex portion is formed on the contact surface 73 to constitute the same coupling means as the convex portion 82 so as to easily install the unit 51 on the stand 52. The stand 52 further includes a U-shaped portion 74 engaged with the convex portion 84 on the right side surface of the unit 51 to firmly fix the unit 51.

The units 51 in the transmitter and receiver systems are often installed outdoors. Coupling portions 90 between the optical module 53 and the E/O conversion module 54 (transmitter system) or between the optical module 53 and the O/E conversion module 54 (receiver system), and coupling portions 100 between the E/O conversion module 54 and the modulation module 55 (transmitter system) or between the O/E conversion module 54 and the demodulation module 55 (receiver system) have a perfect waterproof structure so as to prevent water from entering the apparatus.

The coupling portion 90 of the modules 53 and 54 is precisely machined such that the optical axis and position of the lens system 80 of the optical module 53 are automatically aligned or have a predetermined relationship with those of an E/O conversion element (not shown) of the E/O conversion module 54 in the transmitter system, or that the optical axis and position of the lens system 80 of the optical module 53 are automatically aligned or have a predetermined relationship with those of the O/E conversion element (not shown) of an O/E conversion module 54 in the receiver system.

Since the units 51 are standardized as described above, even if any optical module is connected to the E/O or O/E conversion module 54 to constitute a transmitter or receiver unit, the axis and position of the lens system 80 have a predetermined relationship with those of the E/O or O/E conversion element without any deviation.

Since the contact surface 73 of the stand 52 is machined to be flat as described above at the time of one- or two-dimensional assembly of the standardized units 51, the surface 73 serves as a reference surface in the horizontal and vertical directions. The lower surface concave portion 83 of the unit 51 is brought into direct contact with the contact surface 73 and is fitted on the convex portion of the contact surface 73 to fix the unit 51 on the stand 52. In this case, the side surface convex portion 84 and concave portion 85 of the adjacent units 51 serve as guide portions during coupling of the units 51. Since the convex portion of the contact surface 73 and the side surface 89b of the concave portion 83 of the lower surface of the unit are precisely machined as described above, a lateral angular error of the optical axis of each unit 51 can fall within an allowable range when the unit 51 is fixed on the stand 52. Similarly, since the convex portion of the contact surface 73 and the side surface 89a of the concave portion 83 of the lower surface of the unit 51 are precisely machined, a play in the direction of depth of each unit 51 can also fall within the allowable range. Therefore, the optical axis of the unit 51 directly fixed on the stand 52 is substantially fixed in one direction.

When other units 51 are stacked on this unit 51, since the upper surface 86 and lower surface 87 of the units 51 are machined to be flat as described above, the axes of the upper units 51 can be parallel to those of other units 51 by simply fitting the convex portion 82 of the unit 51 in the concave portion 83 of the adjacent unit 51.

In this manner, when the units 51 are two-dimensionally assembled, as shown in FIG. 5, the contact surface 73 of the stand can be fixed to the unit 51, and the units 51 are also firmly fixed to each other. At the same time, the axes of all the units 51 are parallel to each other.

In the optical space communication apparatus of the present invention, at least one of the transmitter and the receiver is constituted by a single unit, and a plurality of units are combined and coupled by coupling means provided on the units. In addition, each unit is constituted by a plurality of function modules which can be separated from each other.

Since the stand 52 which supports the plurality of units 51 thereon includes the angle adjusting mechanisms 70 and 71, all the units 51 can be adjusted vertically and horizontally while the positional relationship between the units 51 is maintained. That is, the means for supporting the plurality of units has a means for adjusting an angle of the optical space communication apparatus as a whole in the upper, lower, right, and left directions.

When a plurality of units 51 are used to constitute an optical space communication apparatus and a transmission line for optical space communication is to be assured, the units 51, the modules 53, 54, and 55 having different functions can be used depending on the purposes of applications. This will be described with reference to the arrangement of FIG. 5.

For illustrative convenience, numbers ① to ⑨ are assigned to the nine units 51 in FIG. 5.

According to the first arrangement, at least one of the units ① to ⑨ serves as a transmitter unit, and the remaining units serve as receiver units, thus forming an optical space communication apparatus. An apparatus mating this apparatus has an identical arrangement, thereby allowing bidirectional communication. The position of the transmitter unit can be arbitrarily selected from positions ① to ⑨ of the units. The module arrangement of the transmitter and receiver units has been previously described. In this case, the optical module 53 and the O/E or E/O conversion module 54 are arranged in accordance with the same standards, and their directivity is thus not lost. When one transmitter unit and eight receiver units constitute an optical space communication apparatus, eight identical demodulated outputs are obtained from this apparatus. When these demodulated signals are simultaneously processed (e.g., synthesized), reliability and stability of the communication channel is improved.

For example, if these demodulated outputs are digital signals, the eight parallel digital data are discriminated in accordance with a decision by majority, thereby selecting the majority signal as one signal.

If the demodulated outputs are analog signals, one analog signal having the highest S/N ratio might be selected as an output signal. That is, the S/N ratios of the eight analog signals are always monitored and switched to select any signal having the highest S/N ratio. An amplification module for amplifying a signal from the O/E conversion module 54 may be used in place of the demodulation unit in the receiver unit. In this case, the resultant eight modulated signals may be synthesized, only the selected modulated signals may be synthesized, or only good modulated signals may be selected and synthesized. The synthesized signal is demodulated to obtain a space diversity effect.

Even if the position of the transmission beam and the reception power are changed in accordance with atmospheric conditions and any other conditions, a stable demodulated signal output can always be obtained, and the quality of the communication channel can be improved.

The same effect as described above can be obtained in a unidirectional communication arrangement having the units ① to ⑨ as receiver units.

The following conditions are taken into consideration in the second arrangement. When a transmission distance and a transmission margin for obtaining a stable, high-quality communication channel are taken into consideration, the transmission power of the transmission unit can be low when the transmission distance is short. When the transmission distance is increased, the power must be increased accordingly. The transmission power can be preferably changed in accordance with a change in transmission distance in the optical space communication apparatus so as to obtain cost efficient performance. For this purpose, at least two of the units ① to ⑨ are used as the transmission units, and the number of transmission units for transmitting identical signals is changed depending on the situation, thereby increasing or decreasing the transmission power stepwise. Therefore, a stable communication channel is assured regardless of the length of the transmission line. In addition, various E/O conversion modules 54 having E/O conversion elements having different optical outputs are respectively arranged in a plurality of transmission units, that is, a plurality of transmission units having different optical transmission powers are arranged. The transmission units having different optical transmission powers are switched in accordance with changes in transmission distances. By combining the above two arrangements, more precise control for transmission distances and transmission margins is performed.

Third, there are two types of input signals on the transmitter side, i.e., analog and digital signals. Schemes for transmitting an optical signal through a space transmission line upon modulation of the analog signal are AM-IM and FM-IM schemes. Schemes for transmitting an optical signal through the space transmission line upon modulation of the digital signal are ASK-IM, FSK-IM, and PSK-IM schemes. The common optical signal transmission scheme for both the analog and digital signals is a baseband-IM scheme.

Transmitter units having various modulation modules 55 having various modulation schemes such as AM and FM schemes for analog signals or modulation modules 55 having different modulation boards, or transmitter units having various modulation modules having various modulation schemes such as ASK, FSK, and PSK schemes for digital signals or modulation modules 55 having various modulation boards are arranged on the transmitter side. These transmitter units are properly switched, as needed, in accordance with the purposes of applications.

Fourth, a wavelength multiplex transmission scheme is available to simultaneous transmit different signals. According to this scheme, E/O modulation modules 54 having E/O conversion elements having different emission wavelengths are respectively arranged in the transmitter units, and the plurality of transmitter units having different transmission wavelengths are simultaneously operated. In this case, the axes and positions of the optical modules 53 and the E/O conversion modules 54 of the respective transmitter units remain unchanged because these units are constituted by the standard modules.

In this case, a wavelength selection filter for filtering a desired wavelength is arranged in the O/E conversion module 54 and is coupled to the optical module 53, thereby preparing a receiver unit corresponding to each wavelength. Demodulation modules 55 capable of demodulating the transmitted modulated signals or demodulation modules 55 having different modulation boards are coupled to the corresponding O/E conversion modules 54 to demodulate the analog or digital signals. The modulated signals can be simultaneously transmitted in accordance with the wavelength multiplex scheme.

As described above, the plurality of units include a plurality of transmitter units having different transmission wavelengths. In addition, a plurality of units having wavelength selection filters corresponding to the wavelengths are arranged in the receiver of the optical space communication apparatus, thereby performing wavelength multiplex communication.

Fifth, the above wavelength multiplex transmitter unit can simultaneously transmit the same signal at different wavelengths instead of transmitting different signals. In this case, identical modulated signals converted by the O/E conversion modules 54 of the receiver units on the reception side are synthesized and demodulated to obtain a wavelength diversity effect. In this case, the respective wavelength receiver units are spatially separated from each other, the space diversity effect can also be obtained.

As described above, a plurality of units include a plurality of receiver units. Optical signals propagating in space can be simultaneously received by the plurality of receiver units, and the output signals from the receiver units are synthesized to obtain the space diversity effect.

In addition, the plurality of units include a plurality of transmitter units having different transmission wavelengths. Identical signals are input to the plurality of receiver units, and a plurality of receiver units having wavelength selection filters corresponding to the wavelengths are arranged in the optical space communication apparatus on the reception side. The identical signals having different wavelengths are received by the different receiver units, and the output signals from the receiver units are synthesized to obtain both the wavelength diversity effect and the space diversity effect.

Sixth all or a plurality of the units ① to ⑨ are used as receiver units. O/E conversion output levels of these selected receiver units are always detected, and positional variations in the transmission beam can also be detected. Beam position variation information is returned to the optical space communication apparatus on the transmission side, and the stand 52 which supports the transmission units thereon is automatically moved, thereby performing tracking between the optical space communication apparatuses on the transmission and reception sides.

In unidirectional communication, means for transmitting the transmission beam position variation information comprises means for converting this position variation information into a digital signal and transmitting the digital signal through a modem by using a public telephone network or PBX line. The stand 52 on the transmission side is automatically moved by this digital data. In bidirectional transmission, positions of the bidirectional transmission beams often vary, and therefore the stands 52 on both the transmission and reception sides must be simultaneously moved relative to each other. In the same manner as in unidirectional communication, both pieces of beam position variation information are converted into digital data, and these digital data are transmitted through modems by using two public telephone or PBX lines. Alternatively, these digital data may be transmitted through a bidirectional optical space communication line in accordance with the wavelength or frequency multiplex scheme. Both the stands 52 are moved in accordance with the corresponding input data.

As described above, a plurality of units include a plurality of receiver units, and there is provided a means for monitoring reception levels of the plurality of receiver units and detecting beam position errors of optical signals propagating through the space. An output signal from the detecting means is returned to the optical space communication apparatus on the reception side, thus providing a tracking function for automatically adjusting the position on the reception side.

As described above, since the optical space communication apparatuses on the transmission and reception sides have unit structures, the above functions can be obtained. A plurality of functions of these functions can be simultaneously obtained. As a result, an optical space communication apparatus having excellent flexibility and versatility is realized.

In the above embodiment, the transmitter unit is constituted by the optical module, the E/O conversion module, and the modulation module, and the receiver unit is constituted by the optical module, the O/E conversion module, and the demodulation module. The specifications of the optical space communication apparatus are determined at the time of its installation. Changes in specifications during use of the apparatus are not so frequent. When economical advantages are sought and maintenance is taken into consideration, the transmitter unit may be constituted by the optical module and the E/O conversion module, or the E/O conversion module and the modulation module, and the receiver unit may be constituted by the optical module and the O/E conversion module, or the O/E conversion module and the demodulation module.

In the above embodiment, when the transmission distance and the stable communication channel are taken into consideration, the change in number of transmitter units or E/O modules having E/O conversion elements having different optical outputs is exemplified. However, it is possible to use an O/E conversion element having different sensitivities in the O/E conversion modules in the receiver units. For example, in short-distance communication, a PIN photodiode is used as an O/E conversion element to obtain a simple, low-cost circuit arrangement. In long-distance communication, a high-sensitivity element such as an avalanche photodiode is used as an O/E conversion element. Therefore, precise control complying with the desired specifications can be performed.

Figure 8:
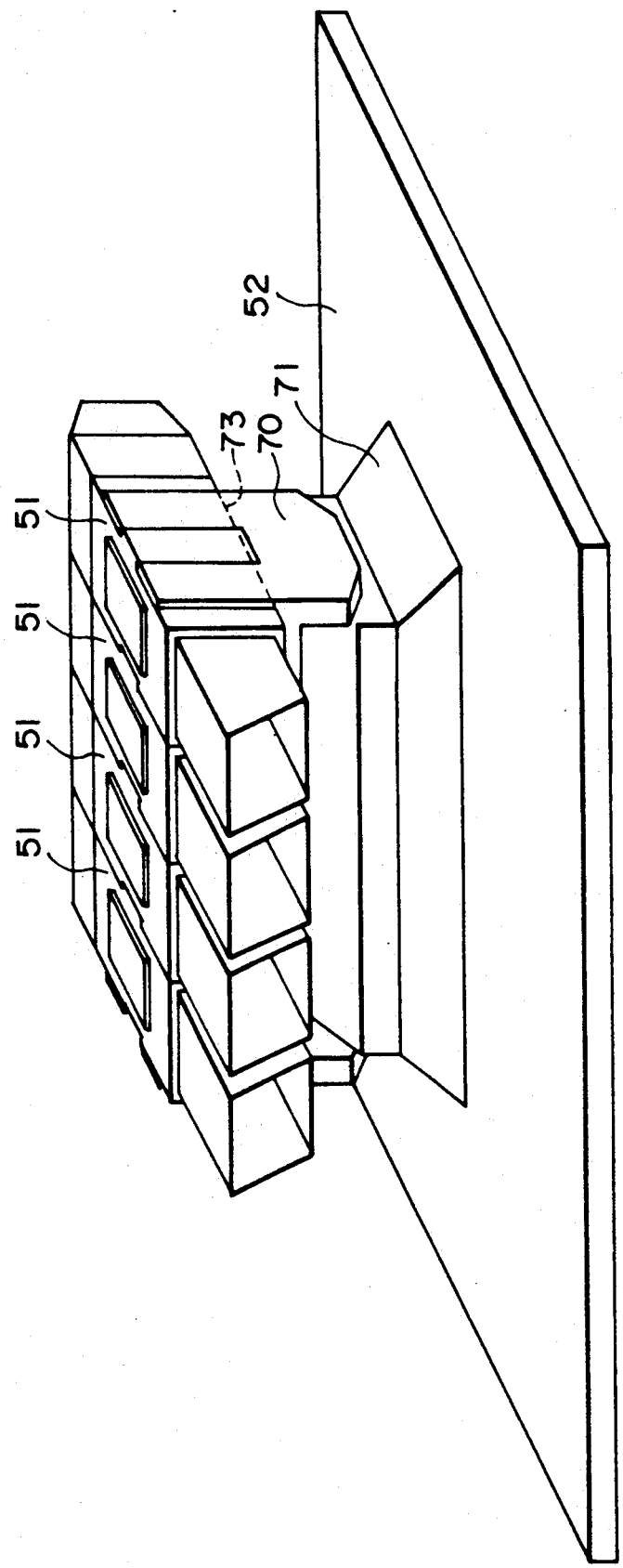
FIG. 8 is a view showing an optical space communication apparatus obtained by one dimensionally combining the units according to another embodiment of the present invention.

In the embodiment of FIG. 5, the units 51 are two-dimensionally combined in a 3 (rows)×3 (stages) structure. However, as shown in FIG. 8, the units 51 may be one-dimensionally arranged. It is generally possible to arrange the units 51 in an m (rows)×n (stages) (m≧1, n≧1). The values m and n are determined in accordance with desired specifications.

Figure 9:
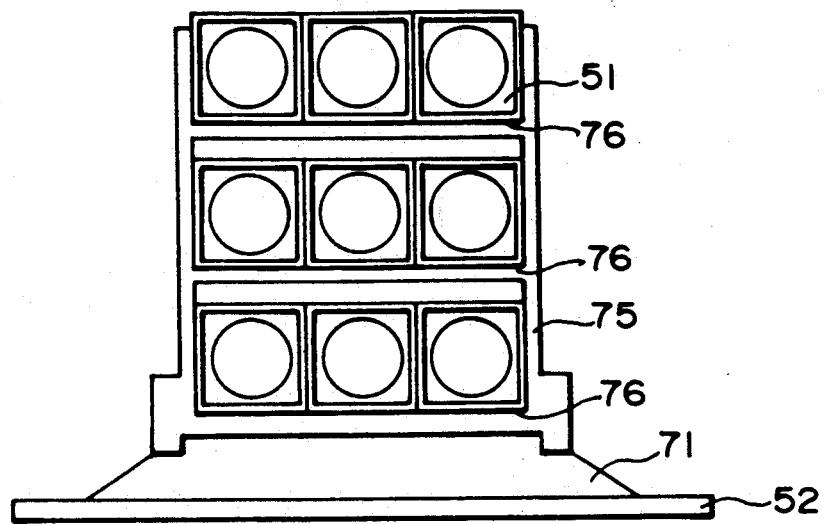
Figure 10:
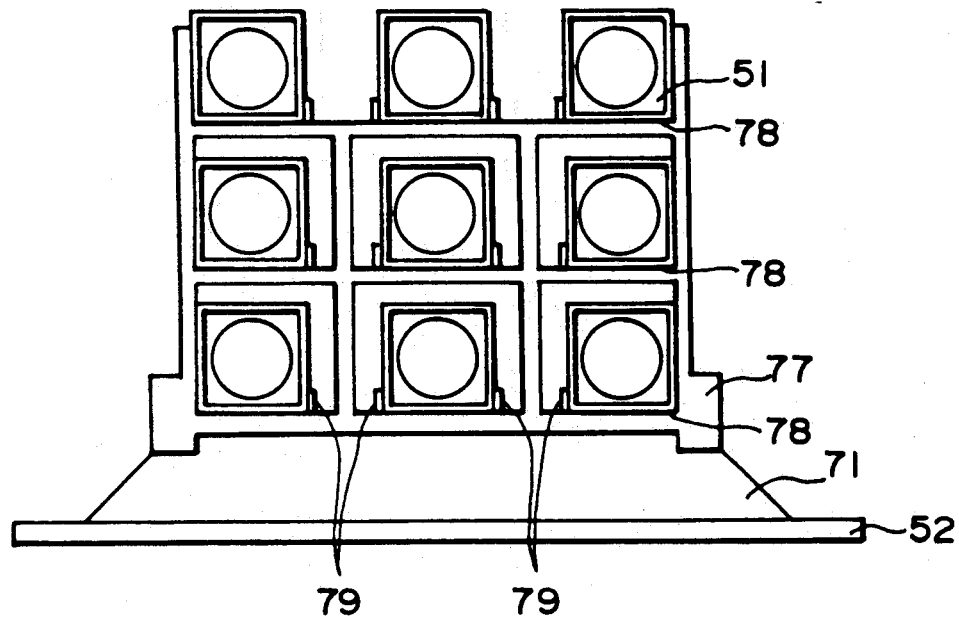

In the above embodiment, the coupling means are formed in the units 51 themselves to directly couple the units 51. However, as shown in FIG. 9, the units 51 are directly coupled to each other in the row direction. The units 51 are separated from each other such that contact surfaces 76 of constituting members 75 of a stand 52 serving as a unit support means are coupled to the units 51. Alternatively, as shown in FIG. 10, the units 51 are fixed by projections 79 and contact surfaces 78 of constituting members 77 of a stand 52, and the units 51 are separated from each other.

As described above, at least one of the transmitter and receiver apparatuses is constituted by a single unit, and there may be provided a coupling means in the unit support means so as to combine a plurality of units.

When such a coupling means is used, the upper surface of the optical module 53 of the unit 51 need not be machined to be flat, unlike the embodiment shown in FIG. 5. In this case, a surface of the stand 52 which is brought into direct contact with the optical module 53 and the lower surface of the optical module 53 are machined to be flat. Therefore, the load on mechanical operation of the optical module 53 is reduced, and the convex portion of the optical module 53 is also omitted.

In this arrangement, since the units 51 are arranged to be spaced apart from each other, it is effective to receive a spread beam or perform space diversity.

In particular, a fine adjustment mechanism for adjusting the angle of the unit in the upper, lower, right, and left directions is arranged in each unit 51 in addition to the angle adjusting mechanisms of the stand 52, such that the function can be effectively obtained. With this arrangement, high precision of mounting of the optical module 53 on the stand 52 which supports the unit 51 is not required. Therefore, the stand 52 and the optical module 53 can be easily manufactured.

As has been described above, at least one of the receiver and transmitter units is constituted by a single unit, and a plurality of single units are combined to constitute the optical space communication apparatus. By employing different combinations, various functions can be easily and stably obtained. Therefore, the present invention can cope with the various needs of a user's specifications.

When each module is constituted by a plurality of function modules which are electrically, optically, and dimensionally standardized, the present invention can easily cope with various user's needs. At the same time, maintenance after installation of the apparatus, and changes in specifications can be facilitated.

We claim:

1. An optical space communication apparatus which propagates an optical signal in a free space to perform optical communication, the apparatus comprising:
    a first module including an optical system and a reference stand portion having a predetermined fixed relation to said optical system, said first module being able to be coupled to or separated from other modules; and
    a second module having a photoelectric conversion function and including an optical system, said second module being able to be coupled to or separated from said first module,
    wherein said first and second modules each include a coupling reference portion for automatically positioning said first and second modules with respect to each other at the time said first and second modules are coupled together at said coupling reference portions.

2. An apparatus according to claim 1, wherein said stand reference portion is coupled to a reference portion of a stand capable of adjusting an angle.

3. An apparatus according to claim 1, wherein a connecting portion between said first module and said second module is provided with means for preventing water from entering from outside.

4. An optical space communication apparatus which propagates an optical signal in a free space to perform optical communication, the apparatus comprising:
    an optical module including an optical element, a reference stand portion having a predetermined fixed relation to said optical element, and a coupling reference portion having a predetermined fixed relation to said optical element and said reference stand portion, said optical module being able to be coupled to or separated from another module at said coupling reference portion; and
    a conversion module including an optical element, for performing photoelectric conversion processing, and a coupling reference portion having a predetermined fixed relation to said optical element of said conversion module, said conversion module being able to be coupled to or separated from said optical module at said coupling reference portions thereof,
    wherein said coupling reference portion of each said module automatically positions said optical and conversion modules with respect to each other at the time of coupling thereof.

5. An apparatus according to claim 4, further including a modulation/demodulation module which can be electrically connected to said conversion module.

6. An apparatus according to claim 4, wherein a connecting portion between said optical module and said conversion module is provided with means for preventing water from entering from outside.

7. An optical space communication apparatus which propagates an optical signal in a free space to perform optical communication, the apparatus comprising:
    an optical module including an optical element, a reference stand portion, and a coupling reference portion for allowing coupling and uncoupling of said optical module to another module, wherein a position of said optical element is fixed with respect to said coupling reference portion and said reference stand portion has a predetermined fixed relation to said optical element and said coupling reference portion; and
    a conversion module, including an optical element, for performing photoelectric conversion processing, and a coupling reference portion for allowing coupling and uncoupling of said conversion module to said coupling reference portion of said optical module, wherein a position of said optical element of said conversion module is fixed with respect to said coupling reference potion of said conversion module.

8. An apparatus according to claim 7, further including a modulation/demodulation module which can be electrically connected to said conversion module.

9. An apparatus according to claim 7, wherein a connecting portion between said optical module and said conversion module is provided with means for preventing water from entering from outside.

10. An optical space communication apparatus comprising:
    an optical module including an optical system and a coupling reference portion for allowing coupling and uncoupling of said optical module to said another module, wherein a position of said optical system is fixed with respect to said coupling reference portion and said optical module has a stand reference portion fixed with respect to said optical system and said coupling reference portion;
    a conversion module, including an optical element, for performing photoelectric conversion processing, and a coupling reference portion for allowing coupling and uncoupling of said conversion module to said coupling reference portion of said optical module, wherein a position of said optical element is fixed with respect to said coupling reference portion of said conversion module; and
    a stand which can be coupled to or separated from said stand reference portion of said optical module.

11. An apparatus according to claim 10, wherein a connecting portion between said optical module and said conversion module is provided with means for preventing water from entering from outside.

* * * * *

UNITED STATES PATENT AND TRADEMARK OFFICE
CERTIFICATE OF CORRECTION

PATENT NO. : 5,264,955
DATED : November 23, 1993
INVENTOR(S) : TETSUO SAKANAKA ET AL.

It is certified that error appears in the above-identified patent and that said Letters Patent is hereby corrected as shown below:

COLUMN 1

Line 28, "comprises a" should read --comprises--.
Line 63, "after repairing, those" should read --the--.
Line 64, "the" (second occurrence) should read --after repairing, those--.

COLUMN 2

Line 37, "or" should be deleted.

COLUMN 3

Line 15, "one dimensionally" should read --one-dimensionally--.

COLUMN 5

Line 60, "time" should read --time of--.

COLUMN 8

Line 43, "is" should be deleted.
Line 45, "The space" should read --Space--.

UNITED STATES PATENT AND TRADEMARK OFFICE
CERTIFICATE OF CORRECTION

PATENT NO. : 5,264,955

DATED : November 23, 1993

INVENTOR(S) : TETSUO SAKANAKA ET AL.

It is certified that error appears in the above-identified patent and that said Letters Patent is hereby corrected as shown below:

<u>COLUMN 16</u>

Line 48, "said" (second occurrence) should be deleted.

Signed and Sealed this

Second Day of August, 1994

Attest:

BRUCE LEHMAN

Attesting Officer     Commissioner of Patents and Trademarks